Patented May 10, 1927.

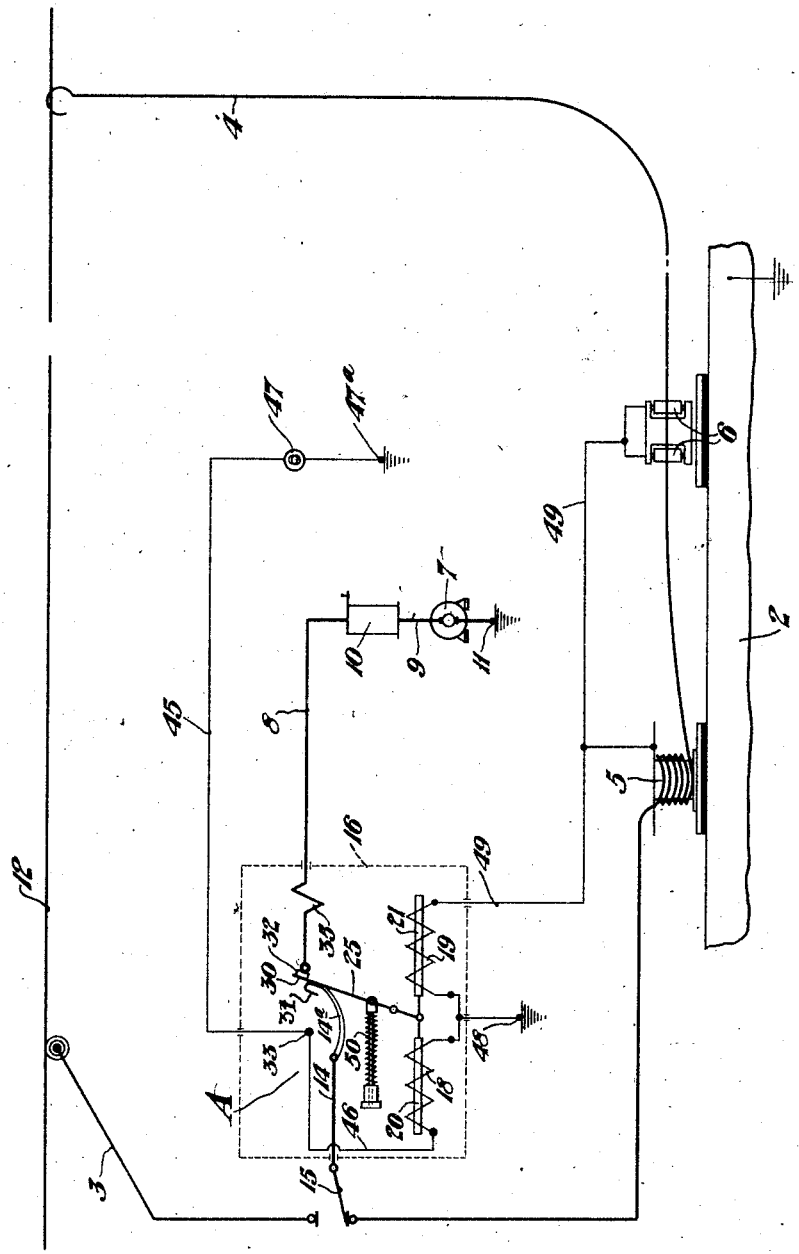

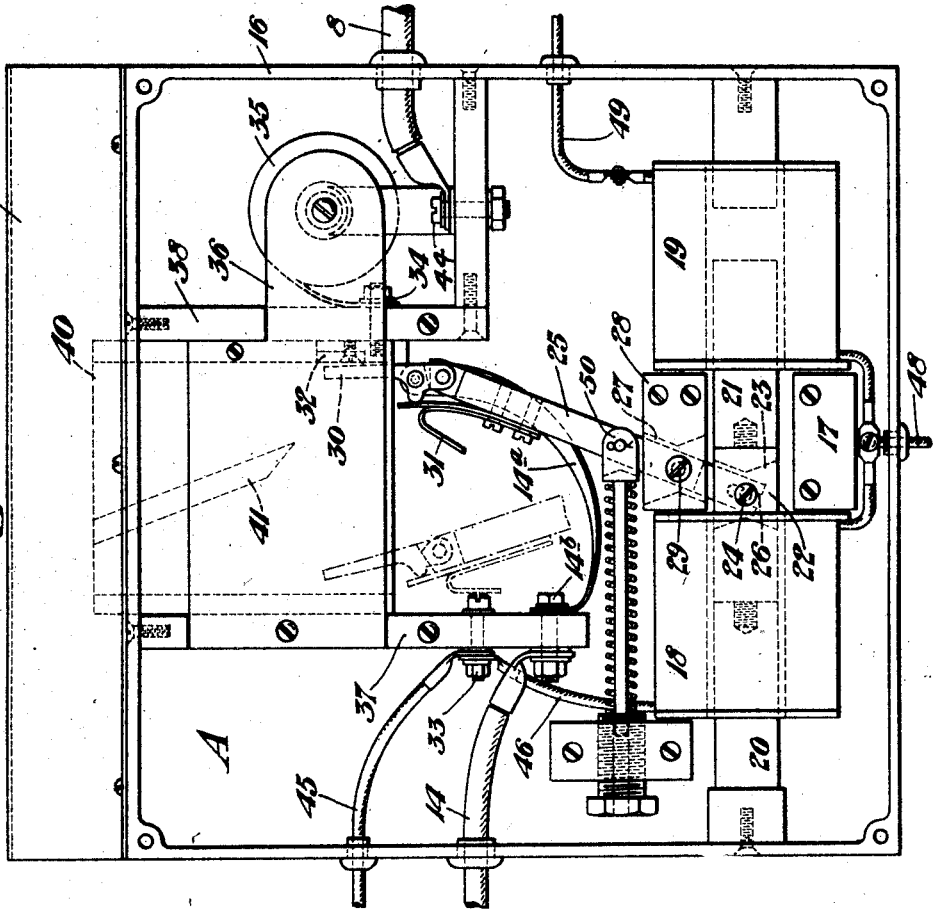
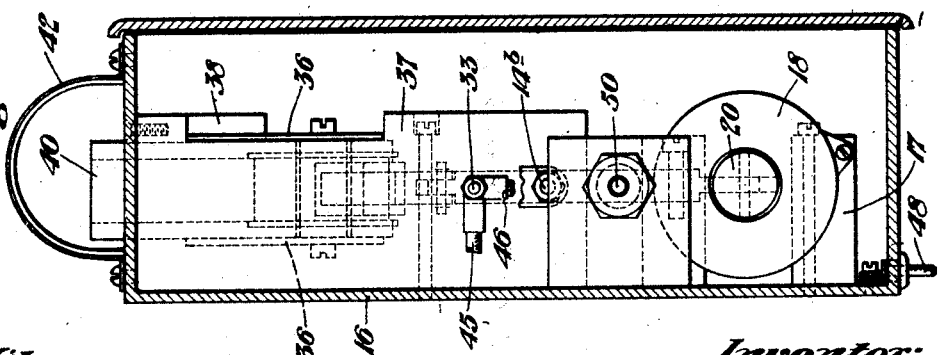

1,627,828

UNITED STATES PATENT OFFICE.

LADURA ALEXANDER BROWN, OF UNIONTOWN, PENNSYLVANIA.

AUTOMATIC SAFETY BREAKER.

Application filed November 6, 1925. Serial No. 67,300.

This invention relates to safety switches and more particularly to safety switches for direct current electrically driven machinery, and while useful for many forms of such machinery it is particularly useful in connection with mine gathering locomotives and other mine machinery.

Gathering locomotives and other machinery used in mines generally receive their power from a single wire supply system, that is direct current is used and the positive line forms a trolley wire while the negative line is grounded. These machines are provided with extension cables carried on reels in order that the machinery may be used beyond the trolley wire terminals. These cables are heavily insulated but due to the hard use they receive in the mines the insulation often becomes broken and the cable forms a short circuit with the cable reel or cable guide. These short circuits cause fires which endanger the lives of the workmen and often times cause considerable property loss.

The present invention provides a novel form of safety switch which will automatically break the circuit to the motor of the machine when the cable is grounded on the cable guide or reel, and which will prevent the remaking of the motor circuit until the cable has been disconnected from the source of current supply.

In the drawings:

Figure 1 is a diagrammatic plan of the circuits made and controlled by the switch.

Figure 2 is a side elevation of the switch.

Figure 3 is an end elevation thereof.

Referring more particularly to the drawings, the numeral 2 designates the frame of the machine to which the novel switch A of this invention is attached. The machine is provided with the usual trolley 3 and cable 4. The cable 4 is carried on a reel 5 and when in use passes out over a series of cable guides 6.

The cable reel 5 and cable guides 6 are insulated from the machine frame 2, which frame is grounded.

The machine is provided with a motor 7, one terminal of which is connected to the positive feed wire 8 by a wire 9 through a controller 10 and the other terminal of which is grounded as at 11 to the machine frame.

The mining machines with which this invention is adapted to be used are operated on direct current, the positive line of which is carried in a trolley wire 12 and the negative line of which is grounded.

The wire 8 is connected through the switch A to a wire 14 and the wire 14 is connected to either the trolley 3 or cable 4 by a transfer switch 15.

The safety switch A comprises a box or casing 16 which encloses the working parts.

An insulating block 17 is secured to the casing 16 and forms a support for the magnet coils 18 and 19. Iron cores or plungers 20 and 21 are mounted within the coils 18 and 19, respectively, and are adapted to be reciprocated when said coils are energized. The cores 20 and 21 are connected by an insulating connecting block 22. The block 22 is provided with a vertically disposed slot 23 having a horizontally disposed pin 24 extending therethrough. A contact arm 25 has its lower end mounted in the slot 23 in the block 22 and is provided with a slot 26 to receive the pin 24 thereby forming a connection between the arm 25 and the block 22.

The arm 25 also passes through a slot 27 in an insulator 28 and is held therein by a pivot pin 29. The arm 25 is connected by a conductor $14^a$ to the wire 14 by a post $14^b$ and carries a pair of contacts 30 and 31 adapted to engage stationary contact members 32 and 33, respectively, at its extreme points of movement. The contact 32 is connected at 34 to a magnet coil 35 supported by iron plates 36—36 one on each side. The plates 36—36 are bolted together through the coil and are secured to insulating supports 37—38 with their other ends open.

An arc chute 40 is positioned within the space bound by the insulating supports 37—38 and the iron plates 36—36 and projects through the top wall of the box A. A suitable barrier or baffle 41 is positioned within the chute 40 to split any arc formed into two parts so that it may be more easily extinguished.

A hood 42 is positioned on the top of the box to prevent water, dirt or other foreign matter entering the box A through the chute 40.

In operation when current is flowing through the coil 35 a magnetic flux is generated in the iron path through the coil 35 and the flux moves across the open end of the iron plates 36—36 which enclose the lower end of the arc chute 40, thereby helping to extinguish any arc formed by the operation of the contacts 30—32.

The coil 35 is connected to a post 44 which in turn is connected by the wire 8 to the controller 10.

The contact 33 is connected to wires 45 and 46. The wire 45 leads to a bell or other signal device 47, the other pole of which is grounded at 47ª, while the wire 46 leads to the magnet coil 18, the other end of which is also grounded at 48.

The other magnet coil 19 is connected by a wire 49 with the cable reel 5 and cable guides 6 and is grounded at 48.

The contact arm 25 is normally held in position against the contact 32 by a spring pressed plunger rod 50.

The operation of the switch A is as follows:

Current normally flows from the trolley 2 or cable 4 according to the position of the transfer switch 15 through the conductors 14 and 14ª to the switch tongue or arm 25 which is normally in contact with the contact 32. The current flows from the contact 32 through the coil 35, post 44 and wire 8 to the controller 10, then through the wire 9 to the positive post of the motor 7 and then to ground.

When the current is flowing through the cable 4, if due to faulty insulation or otherwise, the cable should short circuit with the cable reel 5 or guides 6, a circuit will be formed from the short circuit through the wire 49 and coil 19 to ground at 48, thus energizing coil 19 and exerting a pull on the plunger 21 which will move to the right. As the plunger 21 moves to the right contact arm 25 will be moved to the left so as to break contact with the contact 32 and thereby break the motor circuit. When the arm 25 moves to the left contacts 31 and 33 will engage and make a circuit from the conductors 14—14ª through conductors 45 and 46 to the signal device 47 and coil 18, respectively. The signal device being grounded at 47ª and the coil being grounded at 48.

Coil 18 being thus energized exerts a pull on the plunger 20 in the same direction as the pull exerted by coil 19 on plunger 21, thereby holding the switch arm in engagement with contact 33 until the power circuit is broken by removal of the cable from the trolley wire. The switch arm 25 will automatically move back into engagement with the contact 22 immediately upon the breaking of the power circuit by the removal of the cable from the trolley wire 12. However, if the short circuit is not removed the arm 25 will immediately move back into engagement with the contact 33 when the cable is again engaged with the trolley wire.

While I have shown one specific embodiment of my invention it will be understood that I do not wish to be limited to the details thereof since various modifications may be made without departing from the scope of my invention as defined in the appended claims.

I claim:

1. In combination with a machine, a motor for operating the machine, a single wire supply circuit for the motor including a cable leading from a source of current supply, a reel for said cable, a cable guide, said cable reel and cable guide being insulated from the remainder of said machine, a safety switch through which the positive lead to said motor passes, said switch comprising a casing, a stationary contact having a lead to the motor, a movable contact arm connected by suitable leads to said cable and normally in contact with said stationary contact, a magnet coil and plunger adapted to be energized by the current flowing through said cable reel and cable guide when said cable is grounded thereon, said coil and plunger being adapted to move said contact arm to break the circuit to said motor, a second stationary contact adapted to be engaged by said movable contact arm when said arm is caused to break the circuit to said motor, a second magnet coil and plunger, a connection from said second stationary contact to said second magnet coil, said last named coil being adapted to be energized by the current flowing through said movable contact arm and to hold said arm in engagement with said second named stationary contact whereby said contact arm will not again engage said first named stationary contact until said cable is disconnected from the source of current supply, and means tending to normally force said movable contact arm into contact with said first named stationary contact.

2. In combination with a machine, a motor for operating the machine, a single wire supply circuit for the motor including a cable leading from a source of current supply, a reel for said cable, a cable guide, said cable reel and cable guide being insulated from the remainder of said machine, a safety switch through which the positive lead to said motor passes, said switch comprising a casing, a stationary contact having a lead to the motor, a movable contact arm connected by suitable leads to said cable and normally in contact with said stationary contact, a magnet coil and plunger adapted to be energized by the current flowing through said cable reel and cable guide when said cable is grounded thereon, said coil and plunger being adapted to move said contact arm to break the circuit to said motor, a blow-out coil mounted in said casing adjacent said stationary contact and connected in said motor circuit, said coil being adapted to generate a magnetic flux to aid in extinguishing any arc formed by the breaking of the circuit when the contact arm is disengaged from the stationary contact, a second stationary contact adapted to be engaged by said movable contact arm when said arm is caused to break the circuit to said motor, a second magnet coil and plunger, a connection from said second stationary contact to said second magnet coil, said last named coil being adapted to be energized by the current flowing through said movable contact arm and to hold said arm in engagement with said second named stationary contact whereby said contact arm will not again engage said first named stationary contact until said cable is disconnected from the source of current supply, and means tending to normally force said movable contact arm into contact with said first named stationary contact.

3. In combination with a machine, a motor for operating the machine, a single wire supply circuit for the motor including a cable leading from a source of current supply, a reel for said cable, a cable guide, said cable reel and cable guide being insulated from the remainder of said machine, a safety switch through which the positive lead to said motor passes, said switch comprising a casing, a stationary contact having a lead to the motor, a movable contact arm connected by suitable leads to said cable and normally in contact with said stationary contact, a magnet coil and plunger adapted to be energized by the current flowing through said cable reel and cable guide when said cable is grounded thereon, said coil and plunger being adapted to move said contact arm to break the circuit to said motor, a second stationary contact adapted to be engaged by said movable contact arm when said arm is caused to break the circuit to said motor, a second magnet coil and plunger, a connection from said second stationary contact to said second magnet coil, said last named coil being adapted to be energized by the current flowing through said movable contact arm and to hold said arm in engagement with said second named stationary contact whereby said contact arm will not again engage said first named stationary contact until said cable is disconnected from the source of current supply, and a signal connected with said second named stationary contact and adapted to be energized when said movable contact arm engages said second named stationary contact to thereby notify the operator that the motor circuit is broken.

In testimony whereof, I have hereunto set my hand.

LADURA ALEXANDER BROWN.